US008687337B2

(12) United States Patent
Sha et al.

(10) Patent No.: US 8,687,337 B2
(45) Date of Patent: Apr. 1, 2014

(54) OVER-CURRENT PROTECTION DEVICE

(75) Inventors: Yi An Sha, Xindian (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 320 days.

(21) Appl. No.: 13/238,999

(22) Filed: Sep. 21, 2011

(65) Prior Publication Data

US 2013/0070381 A1 Mar. 21, 2013

(51) Int. Cl.
*H02H 9/08* (2006.01)

(52) U.S. Cl.
USPC ........................................ 361/93.9; 338/22 R

(58) Field of Classification Search
None
See application file for complete search history.

(56) References Cited

U.S. PATENT DOCUMENTS 5,796,568 A * 8/1998 Baiatu ........................... 361/106
5,990,778 A * 11/1999 Strumpler et al. .............. 338/20
6,282,072 B1 * 8/2001 Minervini et al. ............ 361/103
6,348,852 B1 * 2/2002 Kojima et al. .............. 338/22 R
6,480,094 B1 * 11/2002 Chen et al. ..................... 338/328
8,422,188 B2 * 4/2013 Hirobe et al. ................. 361/117
2001/0015688 A1 * 8/2001 Li et al. ........................ 338/22 R
2003/0099077 A1 * 5/2003 Chu et al. ..................... 361/93.9

FOREIGN PATENT DOCUMENTS

CN 1790557 A 6/2006
TW M313372 11/2006
TW 201034034 A 9/2010
TW 201044504 A 12/2010

* cited by examiner

*Primary Examiner* — Jared Fureman
*Assistant Examiner* — Terrence Willoughby
(74) *Attorney, Agent, or Firm* — Egbert Law Offices, PLLC

(57) ABSTRACT

An over-current protection device includes a first substrate, a second substrate, a first grating electrode, a second grating electrode and a positive temperature coefficient (PTC) material layer. The first grating electrode and the second grating electrode are formed on the first substrate and are interlaced and spaced on a same plane. The PTC material layer is formed on the first substrate, the first grating electrode and the second grating electrode, and between the first grating electrode and the second grating electrode. In an embodiment, the first grating electrode and the second grating electrode serve as a current input port and a current output port, respectively.

14 Claims, 4 Drawing Sheets

OVER-CURRENT PROTECTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to an over-current protection device, and more particularly to an over-current protection device with low resistance.

2. Description of Related Art Including Information Disclosed Under 37 CFR 1.97 and 37 CFR 1.98

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperature, so that the circuit or cell can operate normally. However, when an over-current or an over-temperature event occurs in the circuit or cell, the resistance instantaneously increases to a high resistance state (e.g. at least $10^2\Omega$), so as to suppress over-current and protect the cell or the circuit device.

According to an over-current protection device design, a PTC material layer is laminated between two electrode layers, and the resistance of the device is dependent on the thickness of the PTC material layer. The thicker the PTC material layer is, the higher resistance the device becomes. Due to the limitation of current manufacturing process, the reduction of thickness is limited to an extent. Therefore, the device will have relatively high resistance, and cannot meet the demand of the large current devices.

BRIEF SUMMARY OF THE INVENTION

The present application provides an over-current protection device with optimal electrode structural design, by which the resistance of the over-current protection device is decreased. Moreover, a multi-port over-current protection device can be obtained also by appropriately changing the electrode structure, so as to increase the flexibility in use.

In accordance with an embodiment of the present application, an over-current protection device includes a first substrate, a second substrate, a first grating electrode, a second grating electrode and a PTC material layer. The first grating electrode and the second grating electrode are formed on the first substrate, and are interlaced and spaced on a same plane. The PTC material layer is formed on the first substrate, the first grating electrode and the second grating electrode, and between the first grating electrode and the second grating electrode. In an embodiment, the first grating electrode and the second grating electrode serve as a current input port and a current output port, respectively.

In an embodiment, the over-current protection device may further include an over-voltage protection (OVP) device. The OVP device has surfaces on which a first electrode foil and a second electrode foil are formed. The first electrode foil is electrically connected to the first grating electrode or the second grating electrode, whereas the second electrode foil is grounded when the over-current protection device is in use.

BRIEF DESCRIPTION OF THE SEVERAL VIEWS OF THE DRAWINGS

The present application will be described according to the appended drawings in which.

DETAILED DESCRIPTION OF THE INVENTION

Figure 1A:
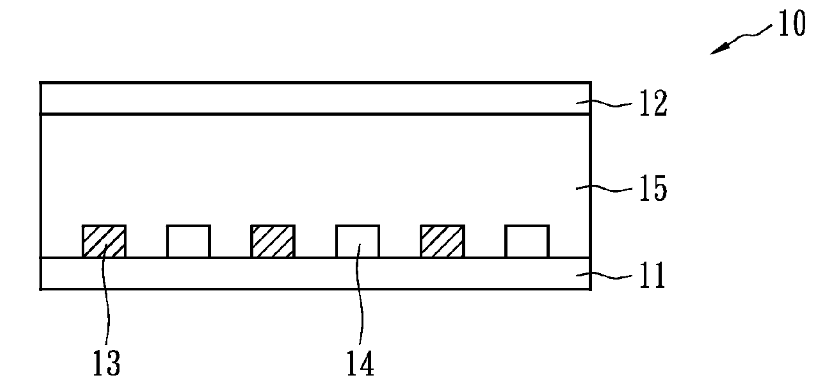
FIGS. 1A through 1C shows an over-current protection device in accordance with a first embodiment of the present application.
Figure 1B:
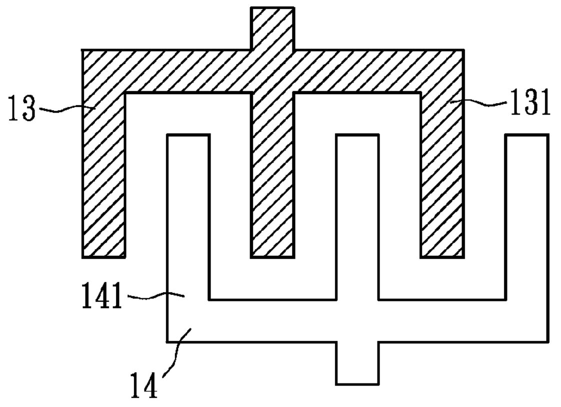
Figure 1C:
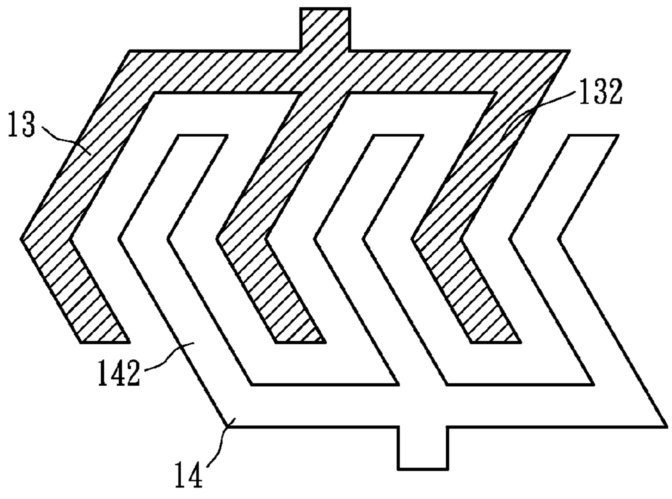

FIGS. 1A through 1C shows an over-current protection device in accordance with a first embodiment of the present application. Referring to FIG. 1, an over-current protection device 10 includes a first substrate 11, a second substrate 12, a first grating electrode 13, a second grating electrode 14 and a PTC material layer 15. The first grating electrode 13 is formed on the first substrate 11, and the second grating electrode 14 is also formed on the first substrate 11. The first grating electrode 13 and the second grating electrode 14 are interlaced and spaced on a same plane. The PTC material layer 15 overlies the first grating electrode 13 and the second grating electrode 14, and is formed on the first substrate 11, the first grating electrode 13 and the second grating electrode 14, and between the first grating electrode 13 and the second grating electrode 14. The second substrate 12 is disposed on the PTC material layer 15. In an embodiment, the first substrate 11 and the second substrate 12 may be glass fiber substrates or other suitable non-conductive material.

FIG. 1B shows the top view of the first grating electrode 13 and the second grating electrode 14 in accordance with an embodiment of the present application. Both the first grating electrode 13 and the second grating electrode 14 include straight grating portions 131 and 141, respectively. The grating portions 131, as well as the grating portions 141, are placed at regular intervals. The straight grating portions 131 and 141 are alternately interlaced and are spaced from each other. The grating portion 131 goes into an interval between two neighboring grating portions 141. Likewise, the grating portion 141 goes into an interval of two neighboring grating portions 131. More specifically, the first grating portions 131 except the first grating portion 131 at one side are individually placed in the intervals of the second grating portions 141, and the second grating portions 141 except the second grating portion 141 at one side are individually placed in the intervals of the first grating portions 131. In other words, a majority of the first grating portions 131 are individually placed in the intervals of the second grating portions 141, and a majority of the second grating portions 141 are individually placed in the intervals of the first grating portions 131. The neighboring grating portions 131 and 141 have a space therebetween. The number of the grating portions 131 and 141 may be modified as desired. The first grating electrode 13 and the second grating electrode 14 may serve as a current input port and a current output port, respectively. In contrast, the first grating electrode 13 and the second grating electrode 14, if needed, may serve as a current output port and a current input port, respectively. In other words, the current input port and the current output port specified in the embodiments of the present application are not unchangeable, and they may be equivalently swapped as desired.

FIG. 1C shows the top view of the first grating electrode 13 and the second grating electrode 14 in accordance with another embodiment of the present application. Both the first grating electrode 13 and the second grating electrode 14 have bending grating portions 132 and 142, respectively, and those bending grating portions 132 and 142 are alternately interlaced and spaced from each other. The grating electrodes 13 or 14 may be in tortuous, zigzag or other shapes, and are not restricted by the embodiments shown in the figures.

As shown in FIGS. 1B and 1C, because the grating electrodes 13 and 14 are interlaced on a same plane, the interspace between the first grating electrode 13 (i.e., grating portion 131 or 132) and the second grating electrode 14 (i.e., grating portion 141 or 142) is extremely decreased compared to that of a traditional protection device in which electrodes are placed on the upper and lower surfaces of the PTC material layer. According to the resistance formula: $R=\rho\times L/A$, where R is resistance, ρ is resistivity, L is the thickness of the PTC material layer or the interval between the electrodes, and A is the effective area of the electrodes, the electrode interval "L" of the present application is much shorter than the thickness of the PTC material layer, so that the resistance "R" is lower. Therefore, the over-current protection device of the present application performs low resistance in comparison with the traditional one.

Figure 2A:
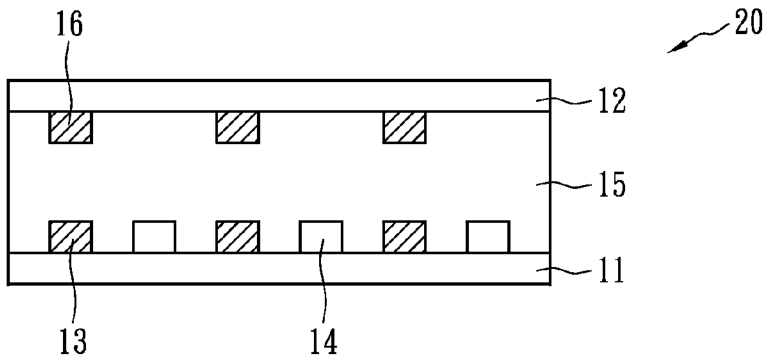
FIG. 2A shows an over-current protection device in accordance with a second embodiment of the present application.

Referring to FIG. 2A, the over-current protection device 20 includes a first substrate 11, a second substrate 12, a first grating electrode 13, a second grating electrode 14, a third grating electrode 16 and a PTC material layer 15. In comparison with the over-current protection device 10 shown in FIG. 1A, the over-current protection device 20 further includes the third grating electrode 16 formed on the PTC material layer 15. The third grating electrode 16 is connected to the first grating electrode 13 to commonly serve as a first current input port. Alternatively, the third grating electrode 16 may sorely serve as a second current input port or a second current output port, so as to form a multi-port over-current protection device.

Figure 2B:
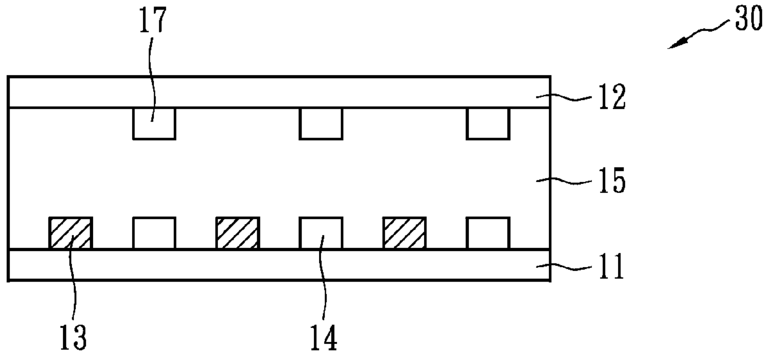
FIG. 2B shows an over-current protection device in accordance with a third embodiment of the present application.

Referring to FIG. 2B, an over-current protection device 30 includes a first substrate 11, a second substrate 12, a first grating electrode 13, a second grating electrode 14, a third grating electrode 17 and a PTC material layer 15. In comparison with the over-current protection device 10 shown in FIG. 1A, the over-current protection device 30 further includes the third grating electrode 17 formed on the PTC material layer 15. The third grating electrode 17 is connected to the second grating electrode 14 to commonly serve as a first current output port. Alternatively, the third grating electrode 17 may solely serve as a second current input port or a second current output port, so as to form a multi-port over-current protection device.

Figure 2C:
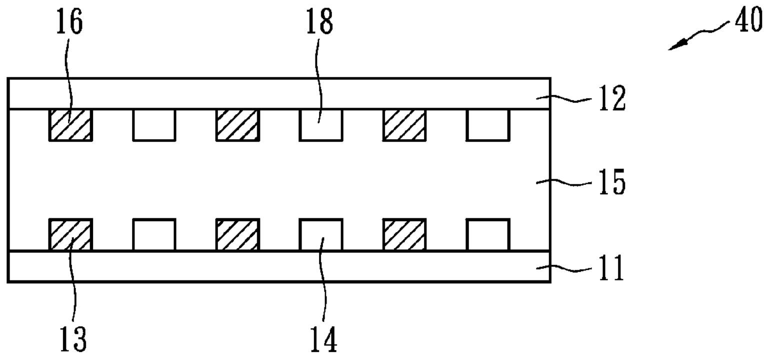
FIG. 2C shows an over-current protection device in accordance with a fourth embodiment of the present application.

Referring to FIG. 2C, an over-current protection device 40 includes a first substrate 11, a second substrate 12, a first grating electrode 13, a second grating electrode 14, a third grating electrode 16, a fourth grating electrode 18 and a PTC material layer 15. In comparison with the over-current protection device 10 shown in FIG. 1A, the over-current protection device 40 further includes the third grating electrode 16 and the fourth grating electrode 18 formed on the PTC material layer 15. The third grating electrode 16 and the fourth grating electrode 18 are interlaced on a same plane. In an embodiment, the third grating electrode 16 is connected to the first grating electrode 13 to commonly serve as a first current input port, whereas the fourth grating electrode 18 is connected to the second grating electrode 14 to commonly serve as a first current output port. Alternatively, the third grating electrode 16 and the fourth grating electrode 18 may serve as a second current input port and a second current output port, respectively, thereby providing a multi-port over-current protection device.

In the light of the foregoing description regarding FIGS. 2A to 2C, the current input port and current output port can be designed by various electrode structures as desired, so as to increase flexibility for many applications.

Figure 3A:
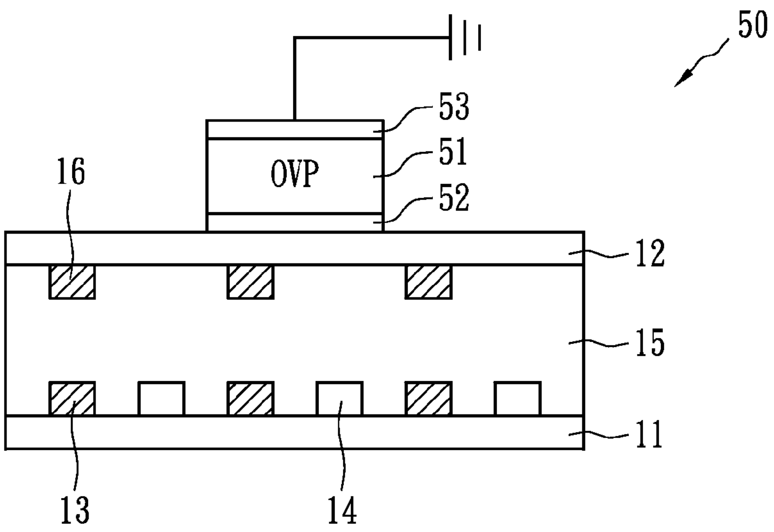
FIG. 3A shows an over-current protection device in accordance with a fifth embodiment of the present application.

FIG. 3A shows an over-current protection device with over-voltage protection function in accordance with another embodiment of the present application. An over-current protection device 50 includes a first substrate 11, a first grating electrode 13, a second grating electrode 14, a third grating electrode 16, a PTC material layer 15, a second substrate 12 and an OVP device 51. Compared to the over-current protection device 20 shown in FIG. 2A, the over-current protection device 50 further includes the OVP device 51 disposed on the PTC material layer 15. A first electrode foil 52 and a second electrode foil 53 are formed on the surfaces of the OVP device 51. In an embodiment, conductive through-holes, conductive posts or the like (not shown) may be formed in the second substrate 12 to electrically connect the first electrode foil 52 and the third grating electrode 16. The third grating electrode 16 is connected to the first grating electrode 13 or the second grating electrode 14 to commonly serve as a current input port or a current output port. The second electrode foil 53 is grounded when the OVP device 51 is in use. In practice, the over-current protection devices 30 and 40 in FIGS. 2B and 2C may be further provided with the OVP device 51 to obtain over-voltage protection function also.

Figure 3B:
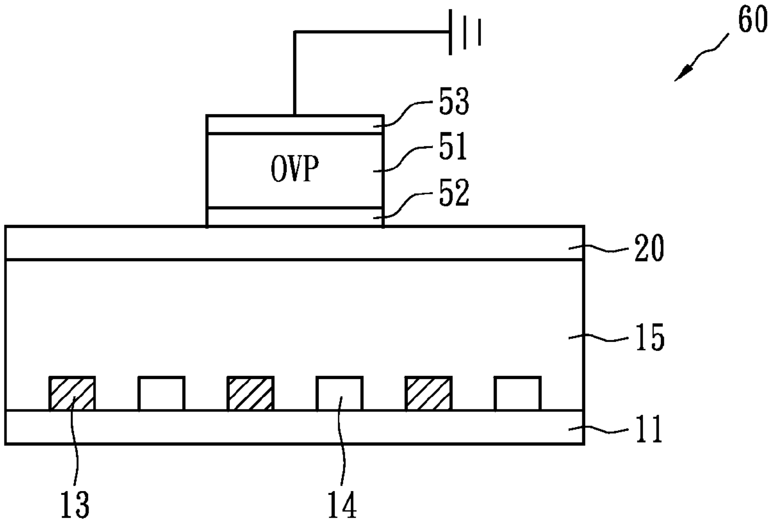
FIG. 3B shows an over-current protection device in accordance with a sixth embodiment of the present application.

Referring to FIG. 3B, an over-current protection device 60 includes a first substrate 11, a first grating electrode 13, a second grating electrode 14, a PTC material layer 15, an electrode layer 20 and an OVP device 51. The OVP device 51 has two surfaces on which a first electrode foil 52 and a second electrode foil 53 are provided. The first electrode foil 52 and the electrode layer 20 may be soldered by reflow, so as to secure the OVP device 51 on top of the electrode layer 20. The second electrode foil 53 is grounded when the OVP device 51 is in use. In an embodiment, the first grating electrode 13 and the second grating electrode 14 serve as the current input port and the current output port, respectively. Accordingly, the over-current protection device 60 can further obtain over-voltage protection function.

Figure 4:
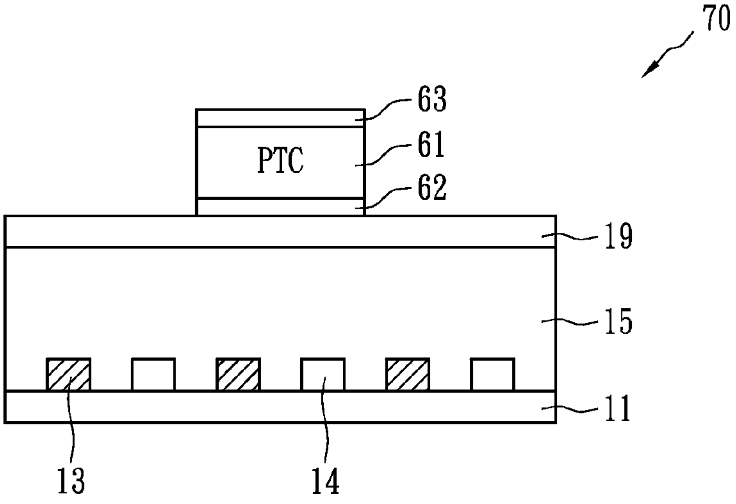
FIG. 4 shows an over-current protection device in accordance with a seventh embodiment of the present application.

FIG. 4 shows an over-current protection device in accordance with an embodiment of the present application. An over-current protection device 70 includes a first substrate 11, a first grating electrode 13, a second grating electrode 14, a PTC material layer 15, an electrode layer 19 and a PTC device

61. The electrode layer 19 is formed on the PTC material layer 15. PTC device 61 has surfaces on which a first electrode foil 62 and a second electrode foil 63 are provided. The first electrode foil 62 is connected to the electrode layer 19, so that the first electrode foil 62 is electrically coupled to the PTC material layer 15. In an embodiment, the first grating electrode 13 and the second grating electrode 14 serve as a current input port whereas the second electrode foil 63 serves as a current output port, by which the PTC material layer 15 and the PTC device 61 are connected in series. Alternatively, the first grating electrode 13 and the second grating electrode 14 may form the current output port, whereas the second electrode foil 63 serves as the current input port, and thus the PTC material layer 15 and the PTC device 61 are connected in series. Moreover, the first grating electrode 13 and the second grating electrode 14 may serve as a first current input port and a first current output port, respectively, and the second electrode foil 63 may serve as a second current input port or a second current output port, thereby providing a multi-port over-current protection device.

According to novel electrode design, the over-current protection device of the present application can obtain low resistance. Moreover, according to a variety of electrode designs for the current input ports and current output ports, or by further introducing the OVP device or PTC device, the over-current protection device of the present application can effectively increase flexibility for various applications.

The above-described embodiments of the present invention are intended to be illustrative only. Numerous alternative embodiments may be devised by persons skilled in the art without departing from the scope of the following claims.

We claim:

1. An over-current protection device; comprising:
a first substrate;
a first grating electrode formed on the first substrate;
a second grating electrode formed on the first substrate, wherein the first grating electrode and the second grating electrode are interlaced and spaced on a same plane; and
a positive temperature coefficient (PTC) material layer formed on the first substrate, the first grating electrode and the second grating electrode, and between the first grating electrode and the second grating electrode, wherein the first grating electrode comprises a plurality of first grating portions placed at regular intervals, the second grating electrode comprises a plurality of second grating portions placed at regular intervals, and the first grating portions and the second grating portions are alternately interlaced and spaced.

2. An over-current protection device comprising:
a first substrate;
a first grating electrode formed on the first substrate;
a second grating electrode formed on the first substrate, wherein the first grating electrode and the second grating electrode are interlaced and spaced on a same plane; and
a positive temperature coefficient (PTC) material layer formed on the first substrate, the first grating electrode and the second grating electrode and between the first grating electrode and the second grating electrode, wherein the first grating electrode comprises a plurality of first grating portions, the second grating electrode comprises a plurality of second grating portions, a majority of the first grating portions are individually placed in intervals of the second grating portions, and a majority of the second grating portions are individually placed in intervals of the first grating portions.

3. The over-current protection device of claim 1, wherein the first substrate is a glass fiber substrate.

4. The over-current protection device of claim 1, further comprising a second substrate formed on the PTC material layer.

5. The over-current protection device of claim 1, wherein the first grating electrode and the second grating electrode serve as a first current input port and a first current output port, respectively.

6. The over-current protection device of claim 5, further comprising a third grating electrode formed on the PTC material layer, wherein the third grating electrode is connected to the first grating electrode to commonly serve as the first current input port.

7. The over-current protection device of claim 5, further comprising a third grating electrode and a fourth grating electrode formed on the PTC material layer, wherein the third grating electrode and the fourth grating electrode are interlaced and spaced on a same plane.

8. The over-current protection device of claim 7, wherein the third grating electrode is connected to the first grating electrode to commonly serve as the first current input port, and the fourth grating electrode is connected to the second grating electrode to commonly serve as the first current output port.

9. The over-current protection device of claim 7, wherein the third grating electrode serves as a second current input port, and the fourth grating electrode serves as a second current output port.

10. The over-current protection device of claim 5, further comprising a third grating electrode on the PTC material layer, and the third grating electrode serves as a second current input port or a second current output port.

11. The over-current protection device of claim 5, further comprising an over-voltage protection device having surfaces on which a first electrode foil and a second electrode foil are formed, wherein the first electrode foil is electrically connected to the first grating electrode or the second grating electrode, and the second electrode foil is grounded when the over-voltage protection device is in use.

12. The over-current protection device of claim 5, further comprising a PTC device having surfaces on which a first electrode foil and a second electrode foil are formed, wherein the first electrode foil is electrically connected to the PTC material layer, and the second electrode foil serves as a second current input port or a second current output port.

13. The over-current protection device of claim 1, further comprising a PTC device having surfaces on which a first electrode foil and a second electrode foil are formed, the first electrode foil being electrically connected to the PTC material layer, wherein the first grating electrode and the second grating electrode serve as a current input port and the second electrode foil serves as a current output port.

14. The over-current protection device of claim 1, further comprising an electrode layer and an over-voltage protection device, wherein the electrode layer is formed on the PTC material layer, the over-voltage protection device has surfaces on which a first electrode foil and a second electrode foil are formed, the first electrode foil is connected to the electrode layer, and the second electrode foil is grounded when the over-voltage protection device is in use.

* * * * *